UNITED STATES PATENT OFFICE.

GEORGE WILLIAM NATHANIEL HAMILTON, OF ALBERT PARK, VICTORIA.

ENAMEL PAINT.

SPECIFICATION forming part of Letters Patent No. 614,050, dated November 8, 1898.

Application filed September 4, 1896. Serial No. 604,877. (No specimens.)

*To all whom it may concern:*

Be it known that I, GEORGE WILLIAM NATHANIEL HAMILTON, a subject of the Queen of Great Britain, and a resident of Greig street, Albert Park, in the Colony of Victoria, have invented a new and useful Enamel Paint, of which the following is a specification.

This invention has been devised to provide the public with an improved paint which has glossy or enamel-like properties and which consists of a combination of materials easily obtainable in most countries.

My enamel paint is cheap and easy to manufacture, highly efficient in its use, is not injuriously affected by acids or alkalies in ordinary use, and being compounded of innocuous materials and insoluble in ordinary liquids it may without risk be used as a coating for the interior of food-utensils, tanks, troughs, &c. I would also point out that my enamel paint is most particularly valuable for use as an antifouling composition for ships' bottoms, wharf-piles, and other subaqueous purposes, and owing to its peculiar rapidity in drying its employment affords additional facility and convenience over slow-drying paints.

The materials used by me and the way in which the same are mixed together to form my paint are as follows: I dissolve about three pounds of good commercial shellac together with about one pound of clear resinous material, as copaiba balsam or white-pine resin, in about seven pints of a solvent, as methylated spirit, ether, or alcohol. I then dissolve about a quarter of a pound of commercial camphor (*Laurus camphora*) in about one pint of similar methylated spirits, ether, or alcohol. I then take about a quarter of a pound of purified white gum, gum-arabic being suitable, or in lieu of gum I may use dextrine or analogous gummy material. This gum (or analogous material) is dissolved in about one-quarter of a pint of pure water and added to the mixture of spirits, shellac, and resin. The whole of the above ingredients are then added together and the whole mixture well-stirred. At this stage the necessary coloring-matter is added. I would have it understood that any suitable color may be used.

In some cases coloring-matter may be omitted—for example, when the enamel paint is to be used on ships' bottoms.

When all the above ingredients and the coloring-matter are mixed, I place the said mixture in a tank or similar receptacle, preferably a covered-in round tank, in which a rotary spindle is placed, said spindle being provided with arms and rotated for a sufficient time to thoroughly associate, dissolve, and mix the constituents with one another. After this is done the paint should be strained and run into cans, tins, barrels, or other packages for sale.

By the employment of my enamel paint upon the bottoms of boats or ships a beautiful smooth surface can be quickly obtained. This smooth surface will enable the boat or vessel to pass through the water with a minimum of friction and consequent economy in power or fuel for its propulsion. The rapidity with which my enamel paint dries from the time it is applied enables the bottom of a vessel to be coated with despatch.

I have found in practice in ordinary weather that my enamel paint dries sufficiently for the next coat to be applied within about ten minutes from the preceding one, so that workmen may be following one another with the extra coatings, and thus economize the time, for instance, of the vessel and its cost of dockage, &c.

Having now particularly described and ascertained the nature of my said invention and in what manner the same is to be performed, I declare that what I claim is—

1. My hereinbefore-described enamel paint consisting essentially of a mixture of methylated spirits, ether or alcohol commercial shellac white-pine resin or copaiba balsam commercial camphor purified white gum, such as gum-arabic and a suitable coloring-matter all incorporated together substantially as and for the purposes set forth.

2. A paint consisting of the following—one gallon of methylated spirits, ether or alcohol three pounds of commercial shellac one pound of white-pine resin or copaiba balsam one-quarter of a pound of camphor one-quarter of a pound of purified white gum-arabic, dextrine or analogous glutinous matter, and sufficient desired coloring-matter all incorporated together substantially as and for the purposes set forth.

Signed at Melbourne, in the Colony of Victoria, this 28th day of July, 1896.

GEORGE WILLIAM NATHANIEL HAMILTON.

Witnesses:
 A. O. SACHSE,
 A. HARKER.